April 21, 1931.   U. A. WHITAKER   1,801,828
SAFETY CAR EQUIPMENT
Filed Nov. 16, 1929

INVENTOR
UNCAS A. WHITAKER
BY *Wm. M. Cady*
ATTORNEY

Patented Apr. 21, 1931

1,801,828

UNITED STATES PATENT OFFICE

UNCAS A. WHITAKER, OF CANTON, OHIO, ASSIGNOR TO THE WESTINGHOUSE AIR BRAKE COMPANY, OF WILMERDING, PENNSYLVANIA, A CORPORATION OF PENNSYLVANIA

SAFETY CAR EQUIPMENT

Application filed November 16, 1929. Serial No. 407,606.

This invention relates to fluid pressure brakes and more particularly to a safety car control equipment.

The principal object of my invention is to provide an electro-pneumatic safety car control equipment embodying means for varying the braking power of the equipment according to the load on the car.

Another object of my invention is to provide an improved foot controlled brake valve device for controlling the operation of an electro-pneumatic safety car control equipment.

Other objects and advantages will appear in the following more detailed description of the invention.

In the accompanying drawing.

Figures 1, 2, 3, 4:
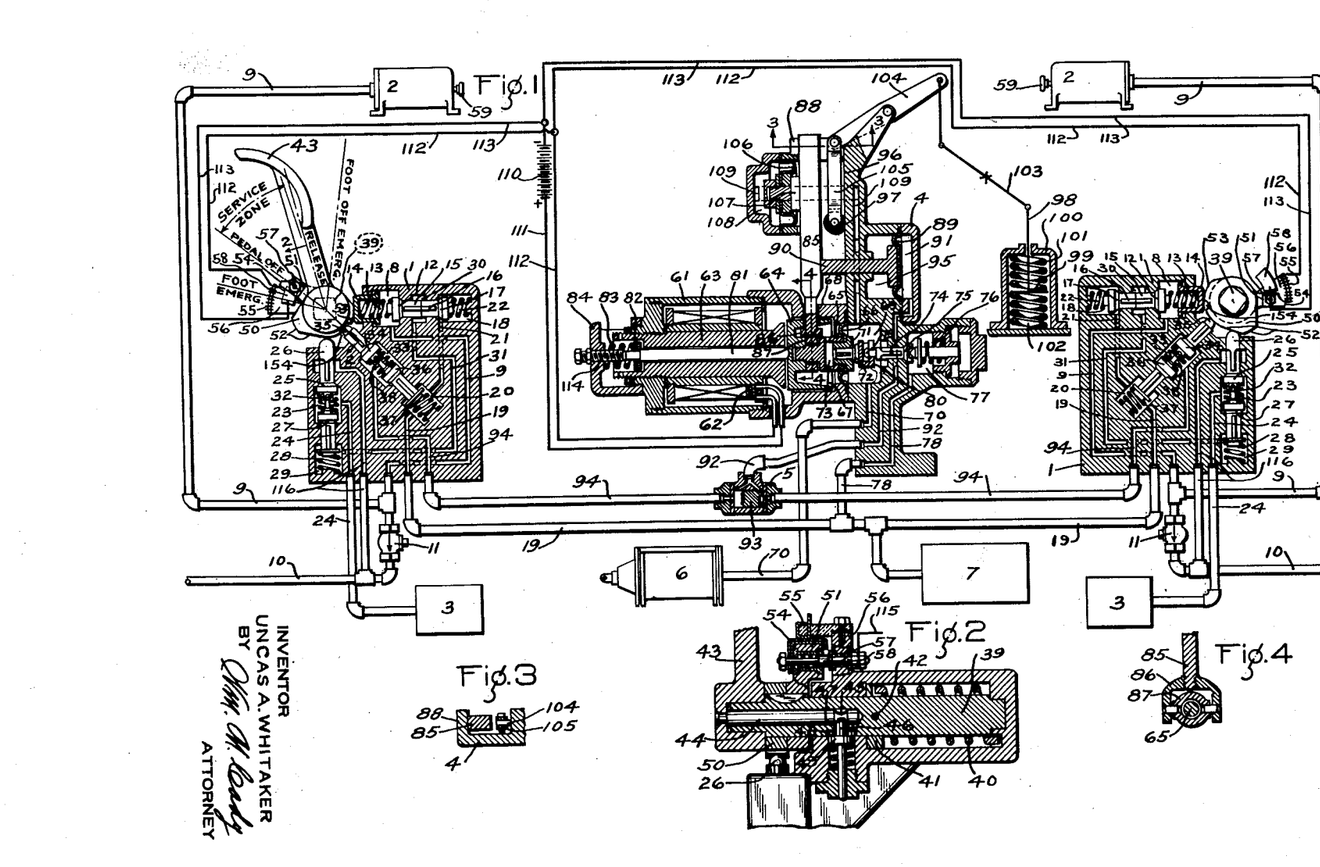
Figure 1 is a diagrammatic view, mainly in section, of an electro-pneumatic safety car control equipment constructed in accordance with my invention.
Fig. 2 is an enlarged fragmentary sectional view of the brake valve device at the operating end of the car taken on the line 2—2 of Fig. 1.
Fig. 3 is a fragmentary sectional view taken on the line 3—3 of Fig. 1.
Fig. 4 is a detail sectional view of a portion of the variable load mechanism taken on the line 4—4 of Fig. 1, the casing and several of the parts contained therein being omitted.

As shown in the accompanying drawing, the electro-pneumatic safety car control equipment is of the double end type and may comprise, at each end of the car, a foot controlled brake valve device 1, a circuit breaker device 2 and a sanding reservoir 3. The equipment also comprises a combined control valve and variable load mechanism 4, a double check valve device 5, a brake cylinder 6, and a main reservoir 7.

Each of the foot controlled brake valve devices 1 may comprise a casing having a valve chamber 8 which is constantly connected to the piston chamber at one side of the usual circuit breaker piston (not shown) through a passage and pipe 9 and to the sand pipe 10, leading to the sand traps, (not shown) through the passage and pipe 9 and a check valve device 11, which prevents the flow of fluid from the pipe 10 to the pipe and passage 9. Contained in the chamber 8 is a safety control valve 12 which is subject to the pressure of a spring 13 also contained in the chamber and interposed between and engaging the valve and a plunger 14 slidably mounted in the casing, the outer end of the plunger projecting through and beyond a portion of the casing.

The safety control valve 12 has a fluted stem 15, the end of which engages the end of the fluted stem 16 of a sanding reservoir charging valve 17 contained in chamber 18, to which the main reservoir 7 is constantly connected through a main reservoir pipe and passage 19, a spring chamber 20 in the casing, and a passage 21. The charging valve 17 is subject to the pressure of a spring 22 also contained in the valve chamber 18.

Contained in a chamber 23, which is constantly connected to the sanding reservoir 3 through a passage and pipe 24, is a sanding valve 25 having a stem 26 which extends through and beyond a portion of the casing.

Also contained in the chamber 23 is a cut-off valve 27 which is subject to the pressure of a spring 28 contained in a chamber 29 constantly connected to a chamber 30, located intermediate the safety control valve chamber 8 and the charging valve chamber 18, through a passage 31.

Interposed between and engaging the sanding valve 25 and cut-off valve 27 is a spring 32, the pressure of which normally maintains the valve 25 seated and tends to seat the valve 27 against the pressure of the spring 28.

Contained in a chamber 33 in the casing is an exhaust valve 34 having a stem 35 which extends through and beyond a portion of the casing. Also contained in this chamber 33 is a supply valve 36 which is subject to the pressure of a spring 37 contained in the chamber 20 and is also subject to the pressure of a spring 38 contained in the valve chamber 33 and interposed between valves 34 and 36, the valve 34 being normally maintained seated through the medium of this spring.

Each of the foot controlled brake valve devices 1 may also comprise an operating shaft 39 which is rotatably mounted in the casing. Within the casing, and surrounding the operating shaft 39, is a torsion spring 40, having one of its ends anchored in the casing and its other end anchored to a collar 41 which is secured to the operating shaft by a pin 42. The force of this spring tends, at all times, to rotate the operating shaft 39 in a clockwise direction.

The outer end portion of the operating shaft 39 extends through and beyond a portion of the casing, and the extreme outer end portion of this shaft is made square in cross section and is adapted to be operatively engaged by a foot pedal 43, which pedal has a recess formed therein corresponding in shape to the outer end portion of the shaft so as to permit of the easy application and removal of the pedal to and from the operating shaft.

The foot pedal 43 is provided with an extension 44, which, in the present embodiment of the invention, is in the form of a round rod, having one end secured to the pedal. Adjacent its free end, this rod is provided with a groove 45.

When the foot pedal is in its operative position, the extension 44 is received in an axial bore in the outer end portion of the operating shaft, and within the groove 45, is engaged by the rounded inner end of a spring pressed plunger 46, which is slidably mounted in the casing, the inner end portion of the plunger extending through a slotted opening 47 in the operating shaft 39. On each side of the opening 47, the shaft 39 is provided with a recess 48 for the reception of a portion of a collar 49 on the plunger 46.

By reason of the engagement of the pedal extension 44 by the inner end of the plunger 46, the foot pedal will be held against accidental separation from the shaft 39 and the plunger collar 49 will be maintained entirely within the casing and free of the shaft 39, so that the shaft may be freely rocked back and forth to control the brakes.

The slotted opening 47 in the shaft 39 and the recesses 48 are so located, than when the foot pedal 43 is moved to "pedal off" position, and the pedal pulled outwardly a sufficient distance that the end of the extension 44 is clear of the plunger 46, the plunger will be forced inwardly, by the pressure of its spring, a sufficient distance that the plunger collar 49 will engage the shaft 39 within the recesses 48, and will thus positively lock the shaft against unintentional rotation when the pedal is removed from the shaft.

In applying the pedal to the shaft 39, the free end of the pedal extension 44 engages the inner end of the plunger 46 and moves it, against the pressure of its spring, a sufficient distance that the collar 49 will be out of interlocking engagement with the shaft 39, so that the shaft may again be freely operated to control the brakes.

In the drawing, the details of the slotted opening 47 and the recesses 48 have not been fully shown for the reason that the pedal arrangement is substantially the same as the pedal arrangement fully shown, described and claimed in an application for United States Letters Patent, filed in the name of Mable M. Thomas as the executrix of Thomas H. Thomas, deceased, on September 4, 1929, for safety car control equipments and serially numbered 390,282, and that the details of the opening 47 and recesses 48 are clearly shown in this prior application.

Secured to the operating shaft 39, intermediate the pedal 43 and the casing is a cam member 50 and an arm 51.

The cam member 50 is provided with a cam surface 52 which is adapted to be operated, by the shaft 39, into and out of operative engagement with the stem 26 of the sanding valve 25 and is also provided with a cam surface 53 which is adapted to be operated into and out of operative engagement with the plunger 14 to control the operation of the safety control valve 12 and sanding reservoir charging valve 17. Intermediate the cam surfaces 52 and 53 the cam member is provided with a notch 154 which, when the foot pedal 43 is in release position, is adapted to permit the valve 34 to seat. The stem 35 of this valve 34 is adapted to be engaged by either the cam surface 52 or 53, according to the direction in which the cam is rotated.

The arm 51 carries a contact plate 54 which is suitably insulated from the arm, and which is adapted to contact with a resistance winding 55 carried by, and suitably insulated from, a lug 56 carried by the casing. Slidably mounted in the arm 51 is a spring pressed contact terminal 57 which is electrically connected to the contact plate 54 and which is adapted to contact with a contact terminal 58 secured to, and suitably insulated from, the lug 56 of the casing.

Each circuit breaker device 2 may comprise a casing containing a piston having a stem 59 projecting through an opening in one end of the casing and adapted to operate the usual line switch (not shown) for opening the car motor supply circuit. The circuit breaker piston is subject to the pressure of a spring contained in the casing.

The combined control valve and variable load mechanism 4 may comprise a magnet 61 having a magnet coil 62 and a pole piece 63. Adjacent to the end of the pole piece 63, is an armature 64 having a stem 65 which is secured, at its inner end, to a flexible diaphragm 66 mounted in the casing of the mechanism.

The chamber 67, formed intermediate the armature 64 and the diahragm 66, is open to the atmosphere by way of an opening 68, formed in the casing. The chamber 69, at the opposite side of the diaphragm 66, is constantly connected to the brake cylinder 6 through a passage and pipe 70, and contains a threaded plug 71 which clamps the stem 65 to the diaphragm 66, and said plug is provided with a seat for an exhaust valve 72 which controls communication from chamber 69 to chamber 67 by way of a passage 73 in the stem 65.

Formed in a partition wall of the casing, is an opening through which the fluted stem 74 of an application valve 75 extends, the wall being provided with a seat for the valve 75, which valve is subject to the pressure of a spring 76 tending to seat the valve. The valve 75 and spring 76 are contained in a chamber 77 which is constantly connected to the main reservoir pipe 19 through a main reservoir branch pipe and passage 78.

The stem 74 of the valve 75 is provided, at one end, with a button 79 which engages a recess formed in a cage 80 secured to the valve 72.

Extending through a central bore in the pole piece 63, is a rod 81, one end of which engages the armature 64. Adjacent its outer end, this shaft is provided with a shoulder upon which washers 82 rest, which washers form a seat for one end of a spring 83, the other end of the spring seating on a cap 84 having screw-threaded connection with the casing of the magnet 61. The pressure of the spring 83 thus acts, through the medium of the rod 81, to urge the armature 64 away from the pole piece 63.

The variable load portion of the mechanism 4 comprises a lever 85, one end of which passes through the opening 68 in the casing, and has screw-threaded connection with a forked member 86 which is contained in the chamber 67 and which is pivotally connected with a collar 87 mounted on the stem 65 and adapted to operatively engage the stem and armature 64. The other end of this lever is adapted to engage a stop 88 formed on the casing.

Mounted in the casing is a flexible diaphragm 89 which is adapted to operate a plunger 90 into and out of operative engagement with the lever 85. The chamber 91 at one side of this diaphragm is connected to the valve chamber 33 in the brake valve device at the operating end of the car through a passage and pipe 92, past the unseated end of a double check valve 93 of the check valve device 5 and through a pipe and passage 94. The chamber 95, at the other side of the diaphragm, containing a portion of the plunger 90, is constantly connected to the atmosphere past the plunger 90.

Interposed between one side of the lever 85 and a face 96 on the casing, and arranged outwardly beyond the plunger 90, is a roller 97 which is adapted to form a fulcrum for the lever 85, the position of the roller being varied according to the load on the car.

Any suitable mechanism may be employed for adjusting the position of the fulcrum roller 97, but for illustrative purposes only, an adjusting mechanism has been shown comprising a plunger 98 having a head 99 arranged within a casing 100 which is carried by the car truck. The plunger head 99 is subject on one side to the pressure of a coil spring 101 and on the other side to the pressure of a coil spring 102.

The outer end of the plunger 98 is operatively connected to one end of a lever 103 which is fulcrumed intermediate its ends to a fixed part of the car body. The other end of this lever 103 is operatively connected to one end of a lever 104 which is fulcrumed intermediate its ends to the casing of the mechanism or any fixed part of the car body. The other end of this lever 104 is operatively connected to the fulcrum roller 97 by a rod or bar 105.

For controlling the operation of the lever 85, a mechanism is provided comprising a flexible diaphragm 106 mounted in the casing, and secured to this diaphragm is a stem or plunger 107, which is adapted to engage the lever 85.

The chamber 108 at one side of the diaphragm 106 is connected to the diaphragm chamber 69 of the control portion of the mechanism 4 through a passage 109. The chamber at the opposite side of the diaphragm 106 is open to the atmosphere.

One end of the resistane winding 55 of each of the brake valve devices 1 is connected to the positive terminal of an electric current supply source, such as a battery 110, over a wire 111, through the magnet coil 62 of the mechanism 4 and over a wire 112, the negative terminal of the battery being connected to the contact terminal 58 of each brake valve device over a wire 113.

In operating the car, the brake valve device 1 at the non-operating end will be in "pedal-off" position and the brake valve device 1 at the operating end of the car will be maintained in release position by the operator's foot pressure on the foot pedal 43.

With the brake valve device at the non-operating end of the car in "pedal off" position, the exhaust valve 34 thereof will, due to the cooperation of the cam surface 53 therewith, be maintained unseated and the supply valve 36 seated. With the exhaust valve 34 unseated, the side of the double check valve 93 toward the non-operating end of the car is connected to the atmosphere by way of pipe and passage 94 at the non-operating end of the car, chamber 33 in the brake valve device and past the unseated valve 34. With this brake valve device in this position, the valves 12 and 25 thereof will be maintained seated and the valves 17 and 27 will be maintained unseated.

When the brake valve device at the operating end of the car is operated to release position, the pressure of the spring 38 causes the valve 34 to seat and the pressure of the spring 37 causes the valve 36 to unseat against the decreased pressure of the spring 33.

Now, fluid under pressure supplied to the main reservoir 7 by the usual compressor, (not shown), flows to the diaphragm chamber 91 of the mechanism 4 by way of main reservoir pipe and passage 19, chamber 20 in the brake valve device at the operating end of the car, past the unseated supply valve 36, through valve chamber 33, passage and pipe 94, double check valve device 5, and pipe and passage 92, the pressure of fluid from the pipe 94 causing the double check valve to operate to its right hand seated position if it should not already be in that position.

The pressure of fluid thus supplied to the chamber 91 causes the diaphragm 89 to flex outwardly, forcing the plunger 90 and the lever 85 of the variable load portion of the mechanism 4 in the same direction. Movement of the lever in this direction causes the armature 64, stem 65, diaphragm 66, sleeve 71 and rod 81 to move toward the left hand against the pressure of the spring 83 until such time as the movement of these associated parts is brought to a stop by the outer end of the lever 85 engaging the stop 88 and by the engagement of the outer end of the rod 81 with the inner end of an adjustable stop 114, having screw-threaded connection with the cap 84 on the magnet 61.

As these parts are thus moved, the pressure of the spring 76 causes the valve 75 to seat, and after the valve is thus seated, the sleeve 71 will move away from the valve 72 and establish communication from the brake cylinder 6 to the atmosphere by way of pipe and passage 70, chamber 69, past the valve 72 and its fluted stem, through passage 73 in the stem 65, diaphragm chamber 67 and opening 68 in the casing. With the application valve 75 seated, fluid under pressure supplied from the main reservoir pipe 19 to the application valve chamber 77, by way of pipe and passage 78, is prevented from flowing to the atmosphere.

Fluid under pressure from the main reservoir pipe 19 is also supplied to each of the sanding reservoirs 3 by way of the chamber 20 in each brake valve device, passage 21, valve chamber 18, past the unseated valve 17, chamber 30, passage 31, chamber 29, past the unseated valve 27, valve chamber 23 and passage and pipe 24, thus charging the sanding reservoirs.

With the equipment thus charged, and it is desired to effect a full service application of the brakes, the operator, by the use of his foot, operates the foot pedal 43 forwardly against the power of the torsion spring 40, and after the pedal has been moved a short distance in this direction, the contact plate 54 carried by the arm 51 contacts with the beginning of the resistance winding 55.

With the brake valve device in release position, the contact terminal 57 is in contact with the contact terminal 58 and this contact is maintained throughout the "service zone".

When the contact plate 54 contacts with the beginning of the winding 55, the circuit through the battery 110 and the magnet coil 62 is closed. The maximum current supply, flowing over this circuit, energizes the magnet, and the magnetic pull of the pole piece 63 maintains the armature 64, stem 65, diaphragm 66 and bushing 71, in their left hand positions against the pressure of the spring 83 acting through the rod 81.

At substantially the same time as the circuit through the magnet coil 62 is closed, the cam 50 engages and forces the stem 35 of the exhaust valve 34 inwardly, unseating the valve 34 against the pressure of the spring 38 and seating the supply valve 36 against the pressure of the spring 37. With the valve 36 seated, the supply of fluid under pressure to the diaphragm chamber 91 of the mechanism 4 is closed off and with the valve 34 unseated, fluid under pressure from this chamber is vented to the atmosphere.

With the diaphragm chamber 91 thus vented, the pressure of the plunger 90 will be entirely relieved from the lever 85, and since the magnetic pull of the pole piece 63 is sufficient to overcome the pressure of the spring 83, the application valve 75 will be maintained seated and the communication from the brake cylinder 6 to the atmosphere maintained open.

After the magnet 61 has been energized by the maximum current flow therethrough, a continued forward movement of the foot pedal 43 causes more of the resistance winding 55 to be cut into the circuit, decreasing the amount of current flowing through the magnet coil 62, which correspondingly decreases the magnetic pull on the armature 64, thus permitting the pressure of the spring 83, acting through the rod 81, to move the armature 64, stem 65, diaphragm 66 and bushing 71 toward the right hand a sufficient distance that the bushing seats on the valve 72 closing communication from the chamber 69 to the atmosphere by way of passage 73, chamber 67 and opening 68 in the casing.

After the bushing 71 is thus seated on the valve 72, the pressure of the spring 83, acting through the valve 72, causes the application valve 75 to be unseated against the pressure of the spring 76.

With the application valve 75 unseated, fluid under pressure from the application valve chamber 77, which is constantly connected to the main reservoir 7, flows past the valve 75 and its fluted stem 74 into the chamber 69, and from thence to the brake cylinder 6 by way of passage and pipe 70 and also to the diaphragm chamber 108.

It will here be noted that a full service application of the brakes can only be effected when the magnet 61 is deenergized, so that the full pressure of the spring 83 acts to maintain the application valve 75 unseated. The deenergization of the magnet 61, in the present embodiment of the invention, is accomplished, in effecting a full service application of the brakes, when the foot pedal 43 has been operated forwardly a sufficient distance that the circuit through the magnet 61 is opened by the contact terminal 57, carried by the arm 51, being moved out of contact with the contact terminal 58 carried by the casing of the brake valve device.

In effecting a full service application of the brakes, the foot pedal 43 will be operated throughout the "service zone" and when the pedal reaches the end of such zone, the circuit through the magnet 61 will be opened as described.

Now when the brake cylinder pressure in chamber 69 acting on the diaphragm 66 has been increased sufficiently, the diaphragm 66 will be flexed toward the left hand against the pressure of the spring 83 until the application valve 75 is permitted to seat, but not sufficiently to permit the bushing 71 to move away from the valve 72.

The above operation, however, is modified by the action of the variable load portion of the mechanism 4 in the following manner:

The plunger 98 being supported by the car truck and the casing of the mechanism 4 being carried by the car body, when the car body is depressed by a load, the movement of the car body relative to the car truck causes the connected levers 103 and 104 to operate to move the bar 105 and fulcrum roller 97 outwardly. When the load on the car is decreased, the levers 103 and 104 are caused to operate to move the bar 105 and fulcrum roller 97 inwardly. The fulcrum roller 97 is thus moved to one side or the other of the stem 107 according to the load on the car.

Assuming the car to be empty, the fulcrum roller 97 will be below the stem 107 as shown in Fig. 1 of the drawing. Now when fluid under pressure is supplied to the diaphragm chamber 108, when the brakes are being applied, the pressure of this fluid acts through the diaphragm 106 and stem 107 on the lever 85. The pressure exerted on the lever, above the fulcrum roller 97, acts on the armature 64 and tends to move the same upwardly against the resistance of the spring 83, thus assisting the brake cylinder pressure in the diaphragm chamber 69 acting through the diaphragm 66 in overcoming the pressure of the spring 83.

Assuming the car to be heavily loaded, the fulcrum roller will be in a position above the stem 107 so that when the brakes are being applied, the pressure of fluid supplied to the diaphragm chamber 108 acts through the diaphragm 106 and stem 107 on the lever 85. The pressure now exerted on the lever, above the fulcrum roller 97, acts on the armature 64 and tends to move the same in a direction toward the right hand against the pressure of fluid in the chamber 69 acting on the diaphragm 66, thus assisting the spring in resisting the pressure of fluid in the chamber 69 acting on the diaphragm 66.

It will thus be seen that the variable load portion of the mechanism 4 operates to limit the maximum brake cylinder pressure obtainable according to the load on the car.

If, instead of effecting a full service application of the brakes, it is desired to limit the brake cylinder pressure, the foot pedal 43 is moved forwardly to, and maintained in, any desired position within the "service zone", and the amount of resistance winding 55 which is cut in circuit will determine the amount of current flowing through the magnet coil 62, and consequently, the magnetic pull on the armature 64. If the car is empty, the variable load portion of the mechanism 4 operates as hereinbefore described to apply force to the armature 64 tending to move the armature toward the left hand. Now when the pressure of fluid in the diaphragm chamber 69, as supplied from the main reservoir 7, by way of the main reservoir pipe 19, pipe and passage 78, application valve chamber 77 and past the unseated application valve 75, acting on one side of the diaphragm 66, plus the force of the magnetic pull on the armature 64 and the force exerted on the armature by the variable load portion of the mechanism, is sufficient to overcome the pressure of spring 83, the diaphragm 66 will flex toward the left hand, permitting the pressure of the spring 76 to seat the application valve 75, and thus close off the further supply of fluid under pressure to the diaphragm chamber 69 and brake cylinder 6.

With the supply of fluid under pressure to the diaphragm chamber 69 thus closed off, the pressure of the spring 83 will prevent the further movement of the diaphragm 66 toward the left. During this movement of the diaphragm, the bushing 71 remains seated on the valve 72 so that fluid under pressure is prevented from escaping from the chamber 69 and brake cylinder to the atmosphere. Since the opposing forces acting on the diaphragm 66 are now substantially equal, the mechanism 4 will remain in a balanced condition until the amount of current flowing through the magnet coil 62 is varied or the position of the fulcrum roller 97 changed.

If the load on the car is such that the fulcrum roller is in a position above the stem 107, the force transmitted thereby to the lever 85 and thence to the armature 64 will assist the spring 83 in opposing the pressure of fluid in the chamber 69 acting on the diaphragm 66. Now, when the pressure of fluid in the diaphragm chamber 69 acting on one side of the diaphragm 66 is sufficient to overcome the pressure of the spring 83 and lever 85, the diaphragm 66 will flex toward the left hand, permitting the spring 76 to seat the application valve 75 and close off the further supply of fluid under pressure to the chamber 69 and brake cylinder 6.

The mechanism 4 will now be balanced as before described and will remain balanced until the amount of current flowing through the magnet 62 is varied or the position of the fulcrum roller changed.

Should it be desired to further increase the brake cylinder pressure, the operator forces the foot pedal 43 further forward, cutting in more of the resistance winding 55, and as a result, decreases the magnetic force acting on the armature 64 and unbalances the mechanism 4, so that the armature 64 and diaphragm 66 is caused to move toward the right hand, unseating the application valve 75 and permitting fluid under pressure to again flow to the chamber 69 and brake cylinder 6. Now when the pressure of fluid in the chamber 69 acting on one side of the diaphragm is sufficient to overcome the opposing pressure acting on the opposite side of the diaphragm, the diaphragm will operate to permit the application valve 75 to be again seated, thus closing off the further supply of fluid under pressure to the brake cylinder.

It will thus be seen that the operator, by the manipulation of the foot pedal, may easily effect a graduated application of the brakes.

Should it be desired to completely release the brakes, the operator relieves some of his pressure on the foot pedal 43, and when he does this, the power of the torsion spring 40 causes the brake valve device to move toward "release" position. When the pedal 43 reaches "release" position, the operator maintains it in this position by the pressure of his foot.

As the foot pedal 43 is permitted to move from any position in the "service zone" toward release position, the resistance winding, cut in the circuit, is decreased until the contact plate 54 of the brake valve device is in contact with the beginning of the winding, when the maximum amount of current will flow through the magnet coil 62 and fully energize the magnet.

With the magnet thus fully energized, the magnetic pull of the pole piece 63 causes the armature to move to its extreme left hand position against the pressure of the spring 83 acting through the rod 81, in which position the bushing 71 will be out of seating engagement with the release valve 72, thus permitting fluid under pressure from the brake cylinder to flow to the atmosphere by way of pipe and passage 70, chamber 69, past the valve 72, through passage 73, chamber 67, and opening 68.

When the foot pedal 43 moves to "release" position, the contact plate 54 of the brake valve device is out of contact with the resistance winding 55 so that the circuit through the magnet coil 62 is open and the magnet 61 deenergized.

At about the time the plate 54 moves out of contact with the beginning of the resistance winding 55, the notch 154 in the cam 50 of the brake valve device is operated into line with the stem 35 of the valve 34, at which time the pressure of the spring 38 causes the valve 34 to seat, closing off the atmospheric connection from the diaphragm chamber 91 of the mechanism 4. The seating of the valve 34 relieves the valve 36 of some of the pressure of the spring 38 so that the pressure of the spring 37 causes the valve 36 to unseat. With the valve 36 unseated, fluid under pressure is supplied from the main reservoir pipe and passage 19 to the diaphragm chamber 91 by way of chamber 20 in the brake valve device, past the unseated valve 36, through chamber 33, passage and pipe 94, past the unseated side of the check valve 93 and pipe and passage 92.

Pressure of fluid thus supplied to the diaphragm chamber 91 causes the diaphragm 89 to operate to force the plunger 90 into engagement with the lever 85. The force exerted on the lever 85 is sufficient to maintain the armature in its extreme left hand position against the opposing pressure of the spring 83, so that when the magnet 61 is deenergized, the armature 64 will be maintained in the same position that it would be in if the magnet were fully energized, thus maintaining the brake cylinder connected to the atmosphere.

Should it be desired to effect a graduated release of the brakes, the operator, instead of permitting the foot pedal 43 to return directly to "release" position, as he does in effecting a full release, may cause the brake valve device to stop in any desired intermediate position within the "service zone". Upon the operation of the brake valve device toward "release" position, the resistance winding 55 is gradually cut out of circuit with the magnet coil 62, thus increasing the magnetic force of the coil acting on the armature 64. The pressure of fluid in the chamber 69, together with the magnetic pull of the pole piece 63 on the armature 64, causes the diaphragm 66 and bushing 71 to move toward the left hand. Now if the application valve 75 should be unseated, the pressure of the spring 76 will seat it, after which the bushing 71 will be moved away from the valve 72 thus venting the brake cylinder to the atmosphere. If the valve 75 should be seated, then the diaphragm causes the bushing to move away from the valve 72.

As the brake cylinder pressure present in the chamber 69 reduces, the force acting on the opposite side of the diaphragm 66 causes said diaphragm to flex toward the right hand, seating the bushing 71 on the valve 72, thus closing off the further flow of fluid from the brake cylinder to the atmosphere.

It will be seen that by operating the foot pedal forwardly over the "service zone", the brake cylinder pressure may be increased as desired, and that by controlling the return of the foot pedal over the "service zone", the brake cylinder pressure may be decreased as desired.

To effect an emergency application of the brakes, the operator, by the use of the foot pipe 43, operates the brake valve device to "foot emergency" position, in which position the contact plate 54, carried by the arm 51, is out of contact with the resistance winding 55, so that the circuit through the magnet coil 62 is open and the magnet deenergized.

When the foot pedal is operated to "foot emergency" position, the cam 50 is rotated in an anti-clockwise direction and one portion of the cam surface 52 engages the stem 35 of the valve 34, causing said valve to be unseated against the pressure of the spring 38. When the valve 34 is thus operated, the pressure of the spring 38 is increased and causes the supply valve 36 to seat against the pressure of the spring 37. When the valve 34 is unseated, the diaphragm chamber 91 in the mechanism 4 is vented to the atmosphere, thus relieving the variable load lever 85 of the pressure of the plunger 90.

With the magnet 61 thus deenergized and the pressure of the plunger 90 removed from the lever 85, the mechanism 4 will operate to effect an emergency application of the brakes in the same manner as described in connection with a service application.

In effecting an emergency application, there is, however, an additional operation which is not performed in effecting a service application, and that is, the automatic sanding of the track rails which is accomplished by the cam surface 52 engaging the valve stem 26 and forcing the sanding valve 25 downwardly from its seat against the pressure of the spring 32, so that fluid under pressure is supplied to the sanding pipe 10 from the sanding reservoir 3 by way of pipe and passage 24, valve chamber 23, past the sanding valve 25 and through a passage and pipe 116. The unseating of the valve 25 increases the pressure of the spring 32, causing the cut-off valve 27 to be seated against the pressure of the spring 28, thus closing off the flow of fluid from the chamber 29, which is connected to the main reservoir 7, to the sanding pipe 10 so that there will be no loss of main reservoir pressure.

Fluid under pressure thus supplied to the sanding pipe 10 is prevented from flowing to the circuit breaker device 2 by the check valve device 11.

In releasing the brakes after a "foot emergency" application, the operator, by the relief of his foot pressure on the foot pedal 43, permits the brake valve device to be operated to release position in which the mechanism 4 will operate to release the brakes in the same manner as described in connection with the release of the brakes after a service application.

As the cam 50 is rotated from foot emergency position, the cam surface 52 permits the valve 25 to seat, closing communication from the sanding reservoir 3 to the sanding pipe 10. The seating of the valve 25 permits the pressure of the spring 28 to unseat the valve 27 to again establish communication through which fluid under pressure is supplied to the sanding reservoir 3.

Should the operator become incapacitated so that he can no longer maintain forward pressure on the foot pedal 43, the force of the torsion spring 40 causes the shaft 39, pedal 43 and cam 50 of the brake valve device to rotate, in a clockwise direction, to "foot off emergency" position in which the valve 34 is unseated by the engagement of the cam surface 52 with the valve stem 35, thus venting the diaphragm chamber 91, in the mechanism 4, to the atmosphere. Since the chamber 91 is thus vented and the magnet circuit is open and the magnet 61 deenergized, the mechanism 4 will operate to effect an application of the brakes in the same manner as described in connection with the effecting of a service application.

In the "foot off emergency" position of the cam 50, the cam surface 52 will have been moved out of engagement with the plunger 14 and the pressure of the spring 13 will have forced the plunger 14 outwardly. When the spring 13 expands in thus moving the plunger, its pressure on the safety control valve 12 is reduced so that the pressure of the spring 22 acting on the valve 17 unseats the valve 12 and seats the valve 17.

With the safety control valve 12 unseated, fluid under pressure from the sanding reservoir 3 is supplied to the circuit breaker device 2, through pipe and passage 24, valve chamber 23, past the unseated valve 27, through passage 31, chamber 30, past the unseated safety control valve 12, through valve chamber 8 and passage and pipe 9. Fluid under pressure thus supplied causes the circuit breaker device to operate to open the usual car motor circuit. Fluid under pressure thus supplied to the pipe 9 flows to the sanding pipe 10 through the check valve device 11. When the sanding reservoir has been vented to the atmosphere by way of the sanding pipe 10, the pressure of the spring contained in the casing of the circuit breaker device will return the circuit breaker piston and piston stem 59 to their normal positions.

To release the brakes after a "foot off emergency" application, an operator, by the pressure of his foot, operates the foot pedal 43 forwardly to "release" position, operating the shaft 39, cam 50 and arm 51 of the brake valve device in an anti-clockwise direction against the power of the torsion spring 40.

As the arm 51 is thus operated, the circuit through the magnet coil 62 will be maintained open and the magnet 61 deenergized.

As the cam 50 is operated, the surface 53 thereof engages the plunger 14 and forces it inwardly against the pressure of the spring 13. This inward movement increases the pressure of the spring so that it causes the safety control valve 12 to seat and the valve 17 to unseat against the pressure of the spring 22. The seating of the safety control valve closes communication from the sanding reservoir 3 to the passage 9 and the unseating of the valve establishes communication from the main reservoir 7 to the sanding reservoir.

When the cam is in release position, the valve 34 will be seated and the valve 36 unseated, so that fluid under pressure will be supplied to the diaphragm chamber 91 in the mechanism 4, causing the diaphragm 89, plunger 90 and lever 85 to move toward the left hand. As the lever 85 is thus moved, it causes the armature 64, diaphragm 66, and bushing 71 to move in the same direction to their extreme positions against the pressure of the spring 83, in which the brake cylinder will be vented to the atmosphere as described in connection with the release of the brakes after a service application.

It will be noted that in effecting the release of the brakes after a "service" or a "foot emergency" application, the magnet 61 is energized so that the plunger 90 need only maintain the mechanism 4 in release position when the brake valve device is in "release" position and the magnet deenergized, and that, in effecting the release of the brakes after a "foot off emergency" application, the plunger 20, without any assistance from the magnet 61, operates the mechanism 4 to release position and maintains it in this position.

While one illustrative embodiment of the invention has been described in detail, it is not my intention to limit its scope to that embodiment or otherwise than by the terms of the appended claims.

Having now described my invention, what is claimed as new and desired to be secured by Letters Patent, is:

1. In an electro-pneumatic brake for a vehicle, the combination with a brake cylinder, of electro-responsive means operative upon deenergization to supply fluid under pressure to the brake cylinder and operative upon energization to connect the brake cylinder to the atmosphere, manually controlled means having a position in which said electro-responsive means is deenergized to effect an application of the brakes and a release position in which said electro-responsive means is deenergized, and means for preventing the electro-responsive means from operating to supply fluid under pressure to the brake cylinder when the manually controlled means is in release position.

2. In an electro-pneumatic brake for a vehicle, the combination with a brake cylinder, of electro-responsive means operative upon deenergization to supply fluid under pressure to the brake cylinder and operative upon energization to connect the brake cylinder to the atmosphere, manually controlled means having a position in which said electro-responsive means is deenergized to effect an application of the brakes and a release position in which said electro-responsive means is deenergized, and means subject to fluid under pressure for preventing the electro-responsive means from operating to supply fluid under pressure to the brake cylinder when the manually controlled means is in release position.

3. In an electro-pneumatic brake for a vehicle, the combination with a brake cylinder, of electro-responsive means operative upon de-energization to supply fluid under pressure to the brake cylinder and operative upon energization to connect the brake cylinder to the atmosphere, manually controlled means having a position in which said electro-responsive means is deenergized to effect an application of the brakes and a release position in which said electro-responsive means is deenergized, mechanism cooperating with said electro-responsive means for varying the braking power according to the load carried by the vehicle, and means cooperating with said mechanism for preventing the electro-responsive means from operating to supply fluid under pressure to the brake cylinder when the manually controlled means is in release position.

4. In an electro-pneumatic brake for a vehicle, the combination with a brake cylinder, of electro-responsive means operative upon de-energization to supply fluid under pressure to the brake cylinder and operative upon energization to connect the brake cylinder to the atmosphere, manually controlled means having a position in which said electro-responsive means is deenergized to effect an application of the brakes and a release position in which said electro-responsive means is deenergized, mechanism cooperating with said electro-responsive means for varying the braking power according to the load carried by the vehicle, and means cooperating with said mechanism and controlled by said manually controlled means for preventing the electro-responsive means from operating to supply fluid under pressure to the brake cylinder when the manually controlled means is in release position.

5. In an electro-pneumatic brake for a vehicle, the combination with a brake cylinder, of electro-responsive means operative upon deenergization to supply fluid under pressure to the brake cylinder and operative upon energization to connect the brake cylinder to the atmosphere, manually controlled means having a position in which said electro-responsive means is deenergized to effect an application of the brakes and a release position in which said electro-responsive means is deenergized, and means for insuring that said electro-responsive means will establish communication from the brake cylinder to the atmosphere when the manually controlled means is operated to release position.

6. In an electro-pneumatic brake for a vehicle, the combination with electro-responsive means operative upon deenergization to effect an application of the brakes, manually controlled means having a release position in which said electro-responsive means is deenergized, and means for preventing said electro-responsive means from operating to effect an application of the brakes when the manually controlled means is in release position.

7. In an electro-pneumatic brake for a vehicle, the combination with electro-responsive means operative upon deenergization to effect an application of the brakes, manually controlled means having a release position in which said electro-responsive means is deenergized, and an application position in which said electro-responsive means is deenergized, and means for preventing said electro-responsive means from operating to effect an application of the brakes when the manually controlled means is in release position.

8. In an electro-pneumatic brake equipment for a vehicle, the combination with a brake cylinder, of electro-responsive means operative upon deenergization to supply fluid under pressure to the brake cylinder and operative upon energization to connect the brake cylinder to the atmosphere, manually controlled means having a release position in which said electro-responsive means is deenergized and an application position in which the electro-responsive means is deenergized, means for preventing the electro-responsive means from operating to disconnect said brake cylinder from the atmosphere when the manually controlled means is in release position and operative upon the operation of the manually controlled means to said application position to permit said electro-responsive means to operate to disconnect the brake cylinder from the atmosphere and to supply fluid under pressure to the brake cylinder.

9. In an electro-pneumatic brake equipment for a vehicle, the combination with a brake cylinder, of electro-responsive means operative upon deenergization to supply fluid under pressure to the brake cylinder and operative upon energization to connect the brake cylinder to the atmosphere, manually controlled means having a release position in which said electro-responsive means is deenergized, and an application position in which the electro-responsive means is deenergized, means for preventing the electro-responsive means from operating to disconnect said brake cylinder from the atmosphere when the manually controlled means is in release position and operative upon the operation of the manually controlled means to said application position to permit said electro-responsive means to operate to disconnect the brake cylinder from the atmosphere and to supply fluid under pressure to the brake cylinder and further operative upon the operation of the manually controlled means from said application position to release position to operate the electro-responsive means to connect the brake cylinder to the atmosphere.

10. In an electro-pneumatic brake, the combination with a brake cylinder, of electro-responsive means operated upon a reduction in current flow for supplying fluid under pressure to the brake cylinder and operative upon deenergization to supply fluid under pressure to the brake cylinder, a brake valve device for controlling the operation of said electro-responsive means, said brake valve device having a release position in which said electro-responsive means is deenergized and a plurality of application positions, and means for holding said electro-responsive means from operating to supply fluid under pressure to the brake cylinder when the brake valve device is in release position and operative to release said electro-responsive means when the brake valve device is operated from release position.

11. In an electro-pneumatic brake, the combination with a brake cylinder, of electro-responsive means operated upon a reduction in current flow for supplying fluid under pressure to the brake cylinder and operative upon deenergization to supply fluid under pressure to the brake cylinder, a brake valve device for controlling the operation of said electro-responsive means, said brake valve device having a release position in which said electro-responsive means is deenergized and a plurality of application positions in which said electro-responsive means is deenergized and a zone over which said brake valve device is operative to control the current flow to said electro-responsive means, and means for holding said electro-responsive means inoperative to supply fluid under pressure to the brake cylinder when the brake valve device is in release position, said means being operative to release said electro-responsive means when said brake valve device is operated from release position.

12. In an electro-pneumatic brake, the combination with a brake cylinder, of electro-responsive means operated upon a reduction in current flow for supplying fluid under pressure to the brake cylinder and operative upon deenergization to supply fluid under pressure to the brake cylinder, a brake valve device for controlling the operation of said electro-responsive means, said brake valve device having a release position in which said electro-responsive means is deenergized and a plurality of application positions, and means subject to fluid under pressure for holding said electro-responsive means inoperative to supply fluid under pressure to the brake cylinder when the brake valve device is in release position, said means being operative to release said electro-responsive means when the brake valve device is operated from release position.

13. In an electro-pneumatic brake, the combination with a brake cylinder, of electro-responsive means operated upon a reduction in current flow for supplying fluid under pressure to the brake-cylinder and operative upon deenergization to supply fluid under pressure to the brake cylinder, a brake valve device for controlling the operation of said electro-responsive means, said brake valve device having a release position in which said electro-responsive means is deenergized and a plurality of application positions, an abutment subject to fluid under pressure for holding said electro-responsive means inoperative to supply fluid under pressure to the brake cylinder when the brake valve device is in release position and a valve operative to release fluid under pressure acting on said abutment for permitting said electro-responsive means to operate to supply fluid under pressure to the brake cylinder, when the brake valve device is operated from release position.

14. In a safety car control equipment, the combination with a main reservoir charged with fluid under pressure, of a brake valve device having a release position and two emergency positions, a sanding reservoir, a plurality of charging valves establishing communication through which fluid under pressure is supplied from the main reservoir to said sanding reservoir when said brake valve device is in release position, a sanding pipe, a circuit breaker device, a safety control valve operative in one of said emergency positions of the brake valve device for seating one of said charging valves and for establishing communication through which fluid under pressure is supplied from said sanding reservoir to said circuit breaker device and sanding pipe, and a sanding valve operative in the other emergency position of the brake valve device for seating the other of said charging valves and for establishing communication through which fluid under pressure is supplied from said sanding reservoir to said sanding pipe.

15. In a safety car control equipment, the combination with a main reservoir charged with fluid under pressure, of a brake valve device having a release position and two emergency positions, a sanding reservoir, a plurality of charging valves establishing communication through which fluid under pressure is supplied from the main reservoir to said sanding reservoir when said brake valve device is in release position, a sanding pipe, a circuit breaker device, a safety control valve operative in one of said emergency positions of the brake valve device for seating one of said charging valves and for establishing communication through which fluid under pressure is supplied from said sanding reservoir to said circuit breaker device and sanding pipe, a sanding valve operative in the other of said emergency positions of the brake valve device for seating the other of said charging valves and for establishing communication through which fluid under pressure is supplied from said sanding reservoir to said sanding pipe, and means for preventing the back flow of fluid from said sanding pipe to said circuit breaker device when the brake valve device is in the last mentioned emergency position.

16. In a safety car control equipment, the combination with a main reservoir charged with fluid under pressure, of a brake valve device having a release position and two emergency positions, a sanding reservoir, a plurality of charging valves establishing communication through which fluid under pressure is supplied from the main reservoir to said sanding reservoir when said brake valve device is in release position, a sanding pipe, a circuit breaker device, a safety control valve operative in one of said emergency positions of the brake valve device for seating one of said charging valves and for establishing communication through which fluid under pressure is supplied from said sanding reservoir to said circuit breaker device and sanding pipe, a sanding valve operative in the other of said emergency positions of the brake valve device for seating the other of said charging valves and for establishing communication through which fluid under pressure is supplied from said sanding reservoir to said sanding pipe, a rotatable cam for controlling the operation of said valves, and an element for manually controlling the operation of said cam.

17. In a safety car control equipment, the combination with a main reservoir charged with fluid under pressure, of a brake valve device having a release position and two emergency positions, a sanding reservoir, a plurality of charging valves establishing communication through which fluid under pressure is supplied from the main reservoir to said sanding reservoir when said brake valve device is in release position, a sanding pipe, a circuit breaker device, a safety control valve operative in one of said emergency positions of the brake valve device for seating one of said charging valves and for establishing communication through which fluid under pressure is supplied from said sanding reservoir to said circuit breaker device and sanding pipe, a sanding valve operative in the other of said emergency positions of the brake valve device for seating the other of said charging valves and for establishing communication through which fluid under pressure is supplied from said sanding reservoir to said sanding pipe, means for controlling the operation of said valves, and a foot pedal for controlling the operation of said means.

18. In a safety car control equipment, the combination with a main reservoir charged with fluid under pressure, of a brake valve device having a release position and two emergency positions, a sanding reservoir, a plurality of charging valves establishing communication through which fluid under pressure is supplied from the main reservoir to said sanding reservoir when said brake valve device is in release position, a sanding pipe, a circuit breaker device, a safety control valve operative in one of said emergency positions of the brake valve device for seating one of said charging valves and for establishing communication through which fluid under pressure is supplied from said sanding reservoir to said circuit breaker device and sanding pipe, a sanding valve operative in the other of said emergency positions of the brake valve device for seating the other of said charging valves and for establishing communication through which fluid under pressure is supplied from said sanding reservoir to said sanding pipe, means subject to the forward pressure of an operator's foot for controlling the operation of the sanding valve to supply fluid under pressure to the sanding pipe and operative upon the entire relief of manual pressure for controlling the operation of said safety control valve to supply fluid under pressure to the circuit breaker device and sanding pipe.

19. In an electro-pneumatic brake, the combination with a brake cylinder, of electro-responsive means subject to variations in current flow for supplying and releasing fluid under pressure to and from the brake cylinder and operative upon deenergization for supplying fluid under pressure to the brake cylinder, a brake valve device having a release position and a plurality of application positions in which said electro-responsive means is deenergized and an application zone over which said electro-responsive means is energized according to the current flow, and means controlled by the brake valve device for rendering the electro-responsive means inoperative to supply fluid under pressure to the brake cylinder when the brake valve device is in release position.

20. In an electro-pneumatic brake, the combination with a brake cylinder, of electro-responsive means subject to variations in current flow for supplying and releasing fluid under pressure to and from the brake cylinder and operative upon deenergization for supplying fluid under pressure to the brake cylinder, a brake valve device having a release position and a plurality of application positions in which said electro-responsive means is deenergized and an application zone over which said electro-responsive means is energized according to the current flow, and means rendering said electro-responsive means inoperative to supply fluid under pressure to the brake cylinder when the brake valve device is operated from said application zone to said release position, said means being operative when the brake valve device is operated from one of said application positions to release position for operating said electro-responsive means to a position where it is inoperative to supply fluid under pressure to the brake cylinder.

21. In an electro-pneumatic brake for a vehicle, the combination with electro-responsive means operative upon deenergization to effect an application of the brakes, a manually controlled brake valve device at each end of the vehicle having a release position in which said electro-responsive means is deenergized and an application position in which said electro-responsive means is deenergized, a plunger device subject to the pressure of fluid for rendering said electro-responsive means inoperative to effect an application of the brakes when one of the manually controlled brake valve devices is in release position, a pipe connecting both of said brake valve devices and plunger device, and valve means operative by fluid under pressure supplied to said pipe through one of said brake valve devices for closing communication from said plunger device through the other of said brake valve devices.

22. In a double end fluid pressure brake equipment for a vehicle, the combination with electro-responsive means operative upon deenergization for effecting an application of the brakes, a brake valve device at each end of the vehicle having a release position and an application position in each of which positions said electro-responsive means is deenergized, a plunger device subject to the pressure of fluid for rendering said electro-responsive means inoperative to effect an application of the brakes when the brake valve device as the operating end of the vehicle is in release position, a pipe connecting both of the brake valve devices with said plunger device, a double check valve device interposed in said pipe between said brake valve device and plunger device and operative by fluid under pressure supplied to said pipe through the brake valve device at the operating end of the vehicle for closing communication from said plunger device through the brake valve device at the non-operating end of the vehicle, and a valve in the brake valve device at the non-operating end of the vehicle normally venting said pipe at the non-operating end of the vehicle to the atmosphere.

23. In a fluid pressure brake equipment, the combination with a fluid pressure supply source, a sanding reservoir and a sand pipe, of a brake valve device having a release position in which fluid under pressure is supplied from said supply source to said sanding reservoir and having an application position in which fluid under pressure is supplied from said sanding reservoir to said sand pipe.

24. In a fluid pressure brake equipment, the combination with a fluid pressure supply source, a sanding reservoir and a sand pipe, of a brake valve device having a release position in which said sanding reservoir is charged with fluid under pressure from said supply source and having an emergency position in which fluid under pressure is supplied from said sanding reservoir to said sand pipe.

25. In a fluid pressure brake, the combination with a sanding reservoir and a sand pipe, of a brake valve device having a release position in which said sanding reservoir is charged with fluid under pressure and having an emergency position in which fluid under pressure is supplied to said sand pipe from said sanding reservoir.

26. In a fluid pressure brake equipment, the combination with a main reservoir charged with fluid under pressure, a sanding reservoir and a sand pipe, of a brake valve device having a release position in which communication is established through which fluid under pressure is supplied from said main reservoir to said sanding reservoir and having an emergency position in which said communication is closed and another communication established through which fluid under pressure from said sanding reservoir is supplied to said sand pipe.

In testimony whereof I have hereunto set my hand, this 9th day of November, 1929.

UNCAS A. WHITAKER.